United States Patent [19]

Einhaus

[11] Patent Number: 5,067,121
[45] Date of Patent: Nov. 19, 1991

[54] DISC-RECORD PLAYER COMPRISING A DISC-LOADING DEVICE FOR A DISC SUPPORTED ON A TRAY

[75] Inventor: Hermanus F. Einhaus, Ham, Belgium

[73] Assignee: U.S. Philips Corporation, New York, N.Y.

[21] Appl. No.: 263,660

[22] Filed: Oct. 27, 1988

[30] Foreign Application Priority Data

Nov. 2, 1987 [NL] Netherlands .................... 8702604

[51] Int. Cl.$^5$ .............................................. G11B 17/04
[52] U.S. Cl. ................................. 369/75.2; 369/77.2; 360/99.07
[58] Field of Search ............... 369/75.1, 75.2, 77.1, 369/77.2, 258, 262, 270–271, 99.03, 99.06–99.07; 360/133, 97.01, 99.01, 99.02

[56] References Cited

U.S. PATENT DOCUMENTS

| 3,833,926 | 9/1974 | Hall | 360/135 |
|---|---|---|---|
| 4,509,158 | 4/1985 | Kang | 569/262 X |
| 4,516,678 | 5/1985 | Fotiadis et al. | 360/133 X |
| 4,535,373 | 8/1985 | Schuh | 360/133 X |
| 4,607,361 | 8/1986 | Schuitmaker et al. | 369/75.2 |
| 4,627,037 | 12/1986 | Tamaru et al. | 369/270 X |
| 4,631,716 | 12/1986 | Ikedo et al. | 369/75.2 |
| 4,692,916 | 9/1987 | Rouws | 369/270 X |
| 4,722,439 | 2/1988 | Grobecker et al. | 360/133 X |
| 4,731,775 | 3/1988 | Katsuyama et al. | 369/75.2 X |
| 4,780,868 | 10/1988 | Vignal | 360/133 X |
| 4,799,209 | 1/1989 | Grobben | 369/75.2 |
| 4,811,323 | 3/1989 | d'Alayer de Costemore d'Arc et al. | 369/75.2 |
| 4,815,066 | 3/1989 | Horvath | 369/75.2 |
| 4,825,429 | 4/1989 | Matsumoto | 369/75.2 |

Primary Examiner—William M. Shoop, Jr.
Assistant Examiner—David Martin
Attorney, Agent, or Firm—David R. Treacy

[57] ABSTRACT

Optical disc player having a frame (61), a turntable (17) including a centering mandrel (17c) and a supporting surface (17b) for a disc (3), a disc-pressure member (191) for pressing the disc onto the turntable in a clamping position, and a disc-loading device (151). The loading device comprises a holder (153) which is adapted to receive, in an initial position, a tray (23) having a carrying surface (29) for the disc. The holder can perform a loading movement to move the tray to and deposit the disc on the turntable and separate the disc from the tray, and an unloading movement to return the disc to the initial position. At opposite sides of the holder the loading device further comprises pivotal elements (155, 156) which are pivotally connected to the frame and which are movably connected to the holder. During loading the pivotal elements are pivotal in a first direction to move the supporting surface of the tray beyond the supporting surface of the turntable, viewed along the axis of rotation of the turntable, and during unloading they are pivoted in an opposite second direction to lift the disc off the turntable.

18 Claims, 7 Drawing Sheets

DISC-RECORD PLAYER COMPRISING A DISC-LOADING DEVICE FOR A DISC SUPPORTED ON A TRAY

CROSS-REFERENCE TO RELATED APPLICATION

This invention is related to that disclosed in applicant's concurrently filed U.S. application Ser. No. 07/263,664.

BACKGROUND OF THE INVENTION

The invention relates to a disc-record player having a frame, a turntable including a centering mandrel and a supporting surface for the disc, and a disc-pressure member for pressing the disc onto the turntable in a clamping position. A disc-loading device comprises a holder which is adapted to receive, in an initial position, a tray having a supporting surface for the disc, to perform a loading movement in order to transfer the tray and the disc to the turntable and separate the disc from the tray, and to perform an unloading movement in order to return the disc to the initial position, Such a disc-record player is known from U.S. Pat. No. 4,692,916 (herewith incorporated by reference). The known disc-record player comprises a housing and a frame which is resiliently supported therein and which carries a loading device and a turntable. The loading device comprises a holder which is movable relative to the turntable in a substantially axial direction between an upper position and a lower position to transfer an optical disc, in particular an optical audio disc of the type referred to as "Compact Disc", to the turntable. The holder comprises two U-section members which are interconnected by transverse members and is adapted to receive, guide and support a disc tray. The tray is substantially rectangular and comprises a disc-supporting surface and means for holding the disc on the supporting surface which include a plurality of radially movable spring-loaded latching elements arranged around the circumference of the disc.

The loading device of the known disc-record player further comprises a drawer which is rectilinearly slidable over fixed parallel guide rails in the frame and which comprises two side walls with grooves engaged by pins of the holder. The loading device further comprises a pressure means comprising a disc pressure member for pressing the disc against the turntable in the player mode of the disc-record player. The pressure means also comprise pins adapted to cooperate with grooves in the side walls of the drawer to bring the disc-pressure member into a clamping position.

Briefly the loading device in the known disc-record player operates as follows. In the slid-out position of the drawer a tray holding an optical disc can be inserted into the holder. After the tray has been slid into the holder the drawer can be slid rectilinearly into the housing through a front opening, the holder moving horizontally during a first stage of the drawer movement and moving downwards during a second stage of this drawer movement. The holder together with the tray move axially past the centering mandrel of the turntable, openings in the holder and the tray ensuring that they cannot come into contact with the turntable. During said movement past the turntable, release pins which extend upwardly relative to the frame and which comprise conical end portions release the latching elements of the tray. Almost simultaneously with this releasing operation the disc-pressure member is brought to the clamping position to press the disc onto the turntable.

Owing to the presence of the rectilinearly movable drawer, which can be slid out almost completely, and which comprises a holder which is movable vertically relative to the drawer to insert the tray, the known disc-record player forms a rather intricate mechanical unit, which requires many operations during assembly. Moreover, the use of a drawer requires a front opening which is substantially larger than necessary to insert a tray holding a disc into the housing. Apart from the fact that a comparatively large front opening may be undesirable for aesthetic reaons, such an opening poses a problem in the case of disc-record players of compact construction. Moreover, the loading device described in the foregoing can be used only in disc-record players having a comparatively large overall height.

SUMMARY OF THE INVENTION

At opposite sides of the holder, viewed in a direction of movement of the holder, the loading device comprises pivotal elements which are pivotally connected to the frame and which are movably connected to the holder. These pivotal elements are pivoted in a first direction during said loading movements to move the supporting surface of the tray beyond the supporting surface of the turntable, viewed along the axis of rotation of the turntable, and are pivoted in an opposite second direction during unloading movement to lift the disc of the turntable.

The disc-record player in accordance with the invention has the advantage that the loading device may comprise a comparatively small number of simple parts, whilst the uncomplicated mechanical construction ensures a correct sequence of the functions to be performed between the insertion of the tray into the holder and the instant at which the disc is pressed against the turntable. Moreover, the loading device can be of a compact construction in width and height, which is favourable for the dimensions of the front of the disc-record player and for the overall dimensions of the housing of the disc-record player. This is accomplished without affecting the ruggedness and reliability of the disc-record player.

The loading device may have coupling means for coupling the tray to the holder at least during a final stage of the loading movement and an initial stage of the unloading movement of the holder. This embodiment ensures that the tray, which is situated partly or wholly inside the housing of the disc-record player, cannot be displaced relatively to the holder. The coupling means guarantee a well-defined position of the tray and the holder relative to one another.

Apart from the tray disclosed in U.S. Pat. No. 4,692,916 another type of tray is known from U.S. Pat. No. 4,722,439 (herewith incorporated by reference). This tray has a generally planar rectangular supporting body with a recessed bottom portion and a supporting surface for an optical disc, in particular an optical audio disc. The tray further comprises a plurality of latching elements, including one resilient element arranged opposite the other fixed latching elements. At the rear the supporting body has a gripping member to which a resilient member is secured to form the resilient latching element. By moving this latching element against its resilient action the distance to the latching elements situated near the front of the supporting body can be increased and the optical disc can be positioned on the supporting surface. The supporting body has a U-shaped aperture which extends from the front to a point beyond the center of the tray, which aperture serves to allow the information recorded on the optical disc to be scanned by means of an optical scanning unit. At opposite sides the known tray has recesses formed in the lateral surfaces of the supporting body.

In a preferred embodiment adapted in particular to cooperate with the tray just described the coupling means comprise at least one projection which is pivotally supported in the holder to engage one of the recesses in the tray during at least a final stage of the loading movement and an initial stage of the unloading movement of the holder. Such a projection can be realized by simple means; the projection may form part of a lever which can be actuated by one of the pivotal elements, the relevant pivotal element cooperating with a first contact face of the lever during the loading movement of the holder to cause the projection to engage said recess, and the relevant pivotal element cooperating with a second contact face of the lever during the unloading movement of the holder to disengage the projection from the recess. Thus, the tray is, in effect, automatically coupled to and disengaged from the holder at the correct instants.

In another preferred embodiment a resilient element is secured inside the holder to a rear wall of the holder to cooperate with the tray. When the tray is inserted by hand into the holder the resilient element is elastically deformed against its spring action, so that during the unloading movement of the holder the element functions as a spring motor and pushes the tray out of the holder over a specific distance to facilitate removal by hand of the tray from the holder.

In a further preferred embodiment adapted to cooperate with the tray disclosed in U.S. Pat. No. 4,722,349 and provided with the resilient element, the pivotally supported projection of the coupling means forms part of a lever which can be actuated at least by the resilient element during the loading movement of the holder to cause the projection to engage the recess in the tray, and which can be actuated by one of the pivotal elements during the unloading movement of the holder to disengage the projection from said recess. In this embodiment a suitable form for the resilient element is a single-bend or multi-bend leaf spring of which one end engages in a suitably formed portion of the lever. The pivotal element can be of a very simple shape. In certain cases it may be required, for example for safety reasons, to assist the actuation of the lever with the resilient element. For this purpose the lever may be provided with a contact portion with which the holder comes into contact during the loading movement in order to ensure a correct pivotal movement of the lever.

Yet another preferred embodiment, in which the disc pressure member is secured to a pressure element which is movable between a clamping position and a position which is more remote from the turntable, is characterized in that at opposite sides, viewed in a direction of movement of the holder, the pressure element is movably secured to one of the pivotal elements and is also slidably secured to the holder. The pressure element is moved to the clamping position during the loading movement of the holder and to the other position during the unloading movement of the holder. This embodiment is particularly favourable if the distance between the pivotal elements in a direction of movement of the holder is comparatively large. However, if that distance is small, it may be advantageous to use an alternative embodiment in which, viewed in a direction of movement of the holder, the pressure element is pivotally secured at opposite sides to two of the pivotal elements, the pressure element being moved to the clamping position during the loading movement of the holder and to the other position during the unloading movement of the holder.

In order to obtain a gradually built-up well-defined pressure, the pressure element is preferably provided with a spring construction, comprising for example a leaf spring having a free end portion which bears against the disc-pressure member and having a fixed end portion secured to the pressure element, to exert on the disc-pressure member a spring force directed towards the turntable.

The disc-record player in accordance with the invention is suitable both for manual operation in which case case the holder is moved by hand, and for motorized operation, in which case the holder is moved by means of an electric motor, generally via a transmission mechanism. If use is made of manual operation and specific transmission mechanism, it is advisable for reasons of stability to arrange a resilient element between the frame and at least one of the pivotal elements, to retain the holder by spring force in an end position reached after a pivotal movement of the pivotal elements. Generally, such measures are not needed when self-locking transmission mechanisms are used .

In a preferred embodiment of the disc-record player intended specifically to cooperate with a tray of the type disclosed in U.S. Pat. No. 4,722,439, the release mechanism comprises a release arm which is pivotally supported in the frame. During the loading movement of the holder the release arm performs a pivotal movement to move the elastically movable latching element of the tray relative to the supporting surface of the tray in order to release the disc. To guarantee a correct operation of the disc-record player, this embodiment is preferably characterized further in that during the loading movement of the holder and the following order, the release arm cooperates with the movable latching element, the disc supported on the tray engages the centering mandrel, the disc reaches the supporting surface of the turntable, and the tray with the fixed latching element moves away from the disc situated on the turntable, and in that the disc-pressure member reaches its clamping position after the disc has been deposited on the turntable.

An embodiment which is dimensioned in such a way that a disc which is already situated on the turntable can be removed from the disc-record player without any problems, is preferably characterized in that during the unloading movement of the holder and in the following order, the tray moves towards the disc situated on the turntable, the fixed latching element engaging over the disc, the disc is removed from the turntable by the tray, and the release arm releases the movable latching element, the movable latching element engaging over the disc to retain the disc on the supporting surface of the tray.

It is to be noted that a commercially available professional optical disc-record player, mainly intended for data storage, comprises a loading mechanism by means of which an optical disc retained on a disc tray of the type disclosed in U.S. Pat. No. 4,722,439 can be transferred to the turntable. The loading mechanism comprises a holder for the tray and a pair of control plates which are arranged at opposite sides of the holder and which are mounted in a frame so as to be movable as a pair relative to one another. The holder comprises laterally projecting pins which each engage two slots formed in the control plates. The slots are oriented in such a way relative to each other that during a movement of the plates relative to one another a tray inserted in the holder performs a movement which results in the optical disc being positioned on the turntable and the tray being positioned at a distance from the disc situated on the turntable. This optical disc-record player has the disadvantage that the loading mechanism is intricate and comprises many parts, which requires many adjustment operations during manufacture of the player. Therefore, the known construction is expensive.

DETAILED DESCRIPTION OF THE DRAWINGS

Figure 1:
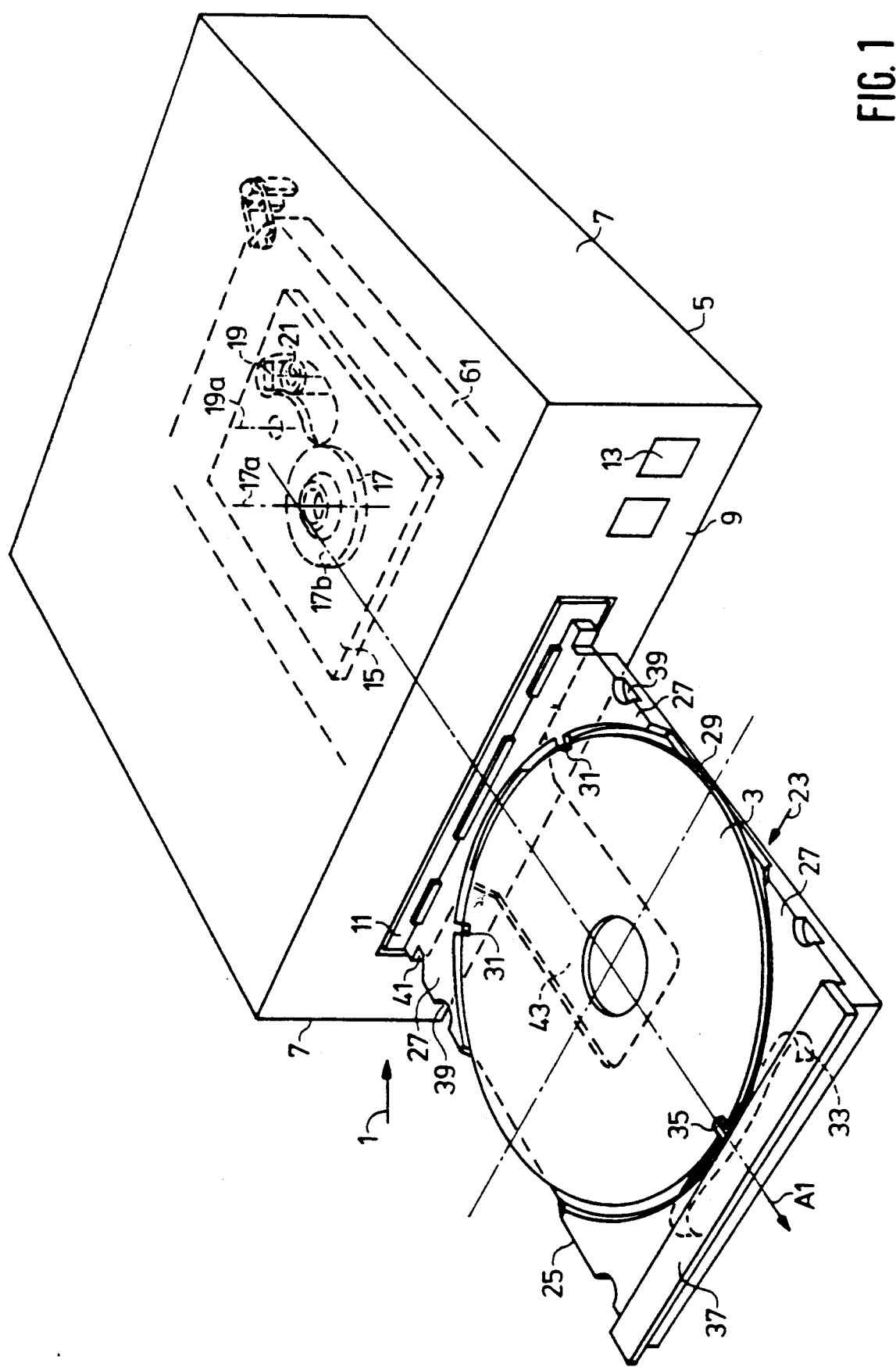
FIG. 1 is a diagrammatic perspective view of the disc player and a known tray.

The disc-record player 1 shown in FIG. 1 is intended for optically reading an optical audio disc (CD) or an optical autio/video disc (CDV), bearing the reference numeral 3 in the drawings. The disc-record player 1 comprises a housing 5 with upright side walls 7 and a front wall 9, in which a front opening 11 is formed and on which controls 13 are arranged. Accommodated in the housing 5 are a turntable 17 which is journalled in a deck 15 so as to be rotatable about an axis of rotation 17A, which turntable 17 has a supporting surface 17B, and which can be driven by an electric motor, not shown; an optical scanning unit 19 which is pivotally supported in the deck 15 and which comprises an objective 21; a frame (bearing the reference numeral 61 in FIG. 1), which is connected to the deck; and a loading device for transferring an optical disc 3 supported on a tray 23 towards and away from the turntable 17. The scanning unit 19 is pivotable about a fixed pivotal axis 19A for radially following the information track of the optical disc during reading of the disc. For a comprehensive description of the scanning unit reference is made to U.S. Pat. No. 4,403,316 (herewith incorporated by reference). It is to be noted that instead of the pivotable scanning unit a linearly movable scanning unit may be employed.

The disc tray 23 is described comprehensively in U.S. Pat. No. 4,722,439 and will therefore be described only briefly. The disc tray 23 has a rectangular supporting body 25 having raised portions 27 which bound a supporting surface 29 for the optical disc 3. The tray further has two fixed latching elements 31 and one movable latching element 35. The fixed latching elements 31 are each arranged on one of the raised portions 27, whilst the movable latching element 35 is secured to a resilient member 33 which is fixed to a gripping member 37 of the tray 23. In the situation shown in FIG. 1 the latching elements 31 and 35 engage over the circumferential edge of the disc 3. to retain the disc. For removing the disc 3 from the tray 23 the movable latching element 35 must be moved in the direction indicated by the arrow A1. For the present invention it is to be noted that the tray 23 has recesses 39 and 41 at opposite sides and that the tray has an elongate aperture 43 to enable the optical disc 3 to be scanned.

Figure 2:
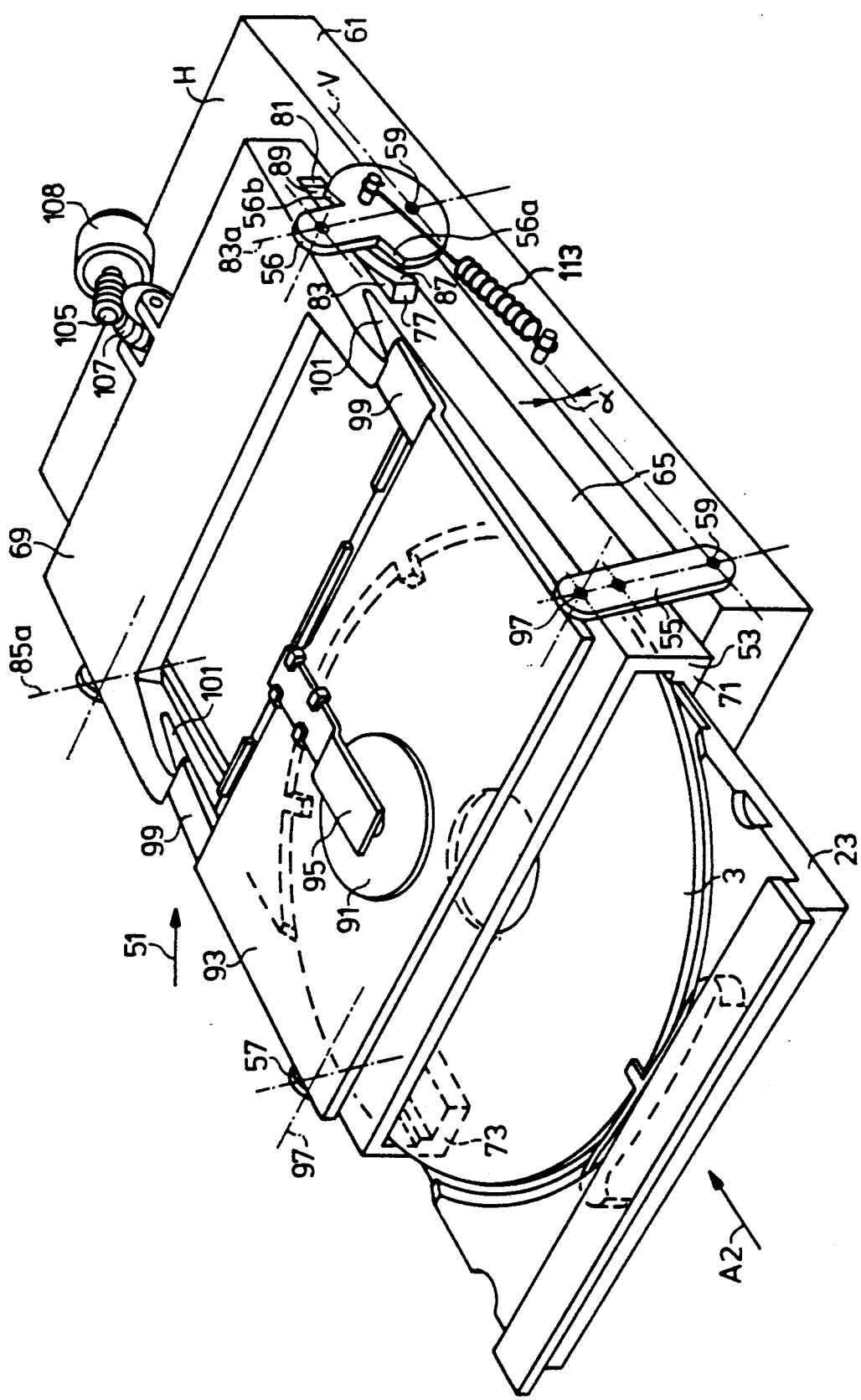
FIG. 2 is a perspective view of the loading device with the tray being shown partly inserted in the holder of the loading device.
Figure 3:
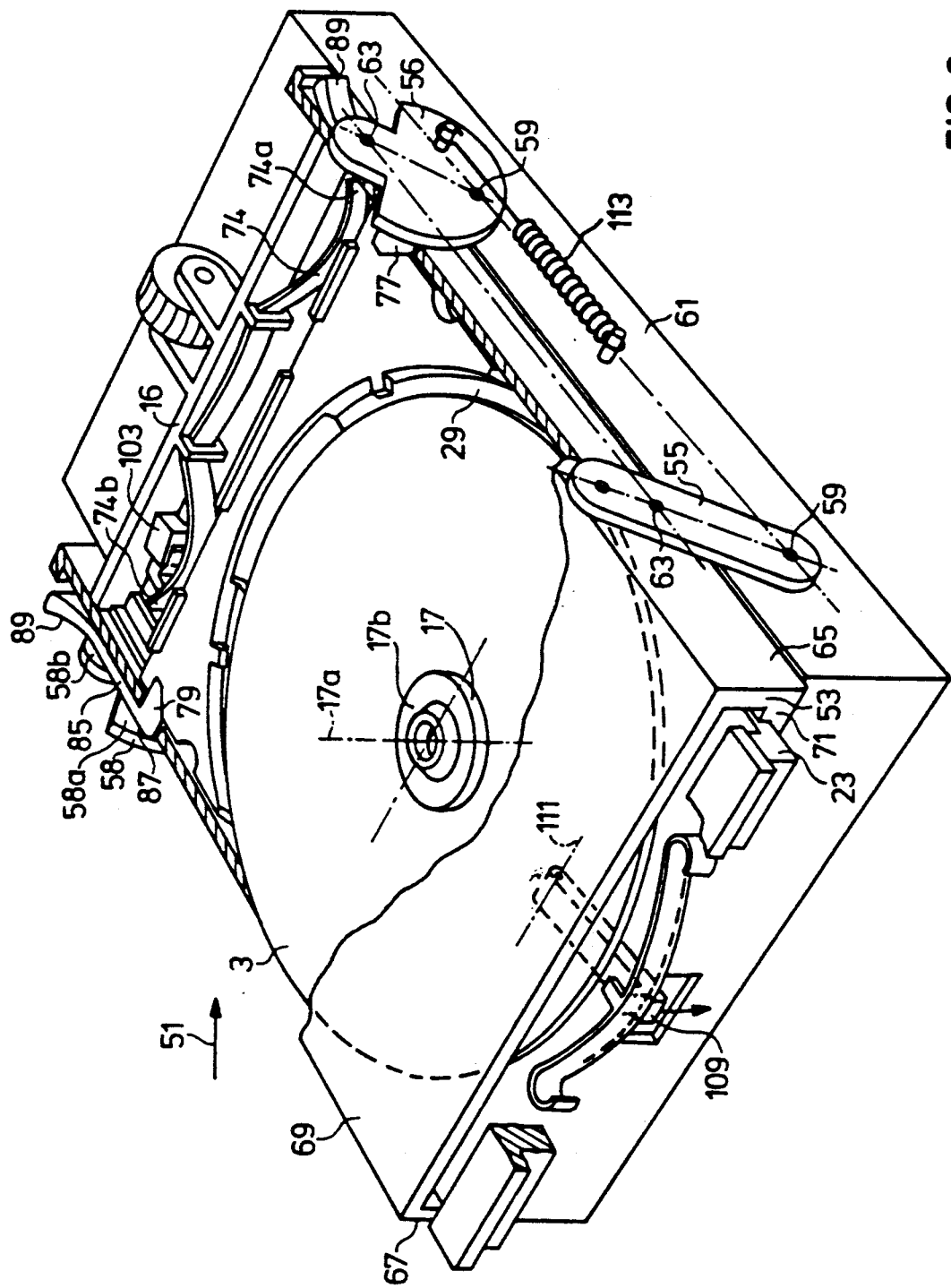
FIG. 3 is a perspective view with the disc tray shown fully inserted in the holder and the optical disc situated on the turntable FIG. 4 diagrammatically illustrates a number of positions of the tray of FIG. 2.

The loading device 51 shown in FIGS. 2 and 3 comprises a holder 53 and two pairs of pivotal elements 55, 56 and 57, 58 respectively. The pivotal elements 55 to 58 are pivotally supported in the frame 61 by means of pins 59, the frame being secured to the deck 15 as already stated. Moreover, the pivotal elements 55 to 58 are pivotally connected to two upright side wall 65 and 67 of the holder 53 by means of pins 63. Between the side walls 65 and 67, which are interconnected by a partly open upper wall 69 to form a rigid unit, a space is formed in which the tray 23 with the optical disc 3 can be inserted. For a correct guidance of the tray 23 in the holder 53 two guide rails 71 and 73 are arranged at the lower sides of the side walls 65 and 67. In the present case a multi-band leaf spring 74 having two free ends 74a and 74b is arranged inside the holder 53. The leaf spring 74 is secured to a rear wall 76 of the holder 53 and serves for resiliently braking the tray 23 after it has been inserted by hand into the holder 53 in the direction indicated by the arrow A2.

The present loading device 51 comprises two coupling projections 77 and 79 which are adapted to cooperate with recesses 41 in the tray 23 and which are pivotally mounted in openings 81 in the side walls 65 and 67 of the holder 53. For this purpose said projections 77 and 79 form part of levers 83 and 85 respectively, which are pivotable about vertical axes 83a and 85a respectively. Each of the levers 83 and 85 has a first contact face 87 adapted to cooperate with an element portion 56a or 58a of the pivotal element 56 or 58, respectively and a second contact face 89 adapted to cooperate with an element portion 56b or 58b of the pivotal element 56 or 58 respectively.

The disc-record player shown in FIG. 1 comprises a disc-pressure member bearing the reference numeral 91 in FIG. 2. The disc-pressure member 91 is axially movable in an opening in a pressure element 93 and cooperates with a bent leaf spring 95 which is secured to the pressure element 93. The pressure element 93 is substantially planar, is pivotally connected to the pivotal elements 55 and 57 by means of pins 97 and comprises tabs 99 which are movable in narrow slots 101 formed between the side walls 65 and 67 and the upper wall 69.

Figure 4:
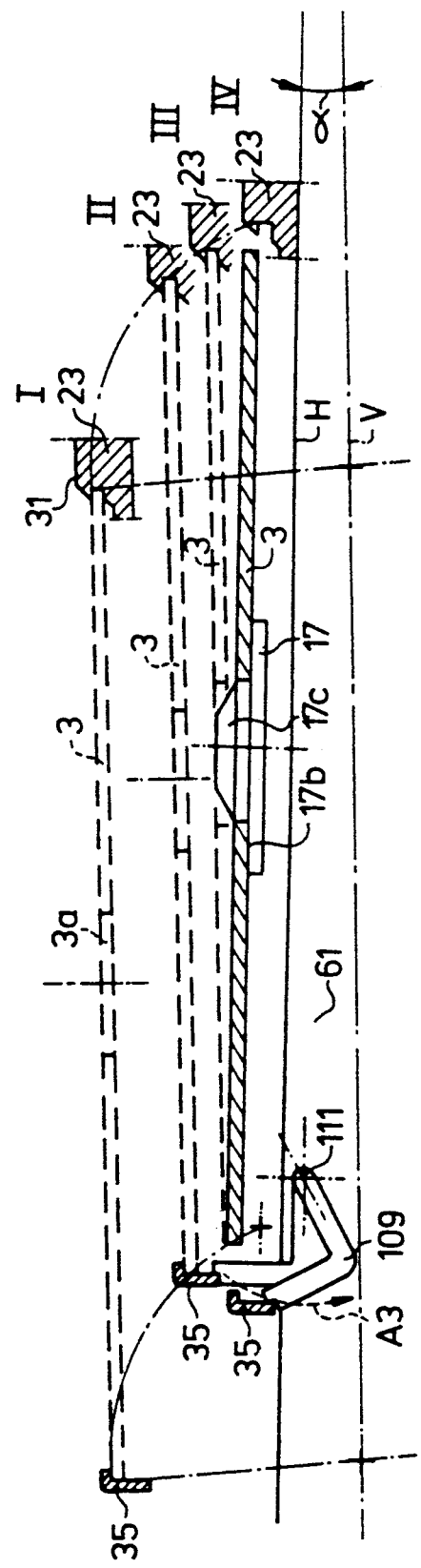
Figure 5A:
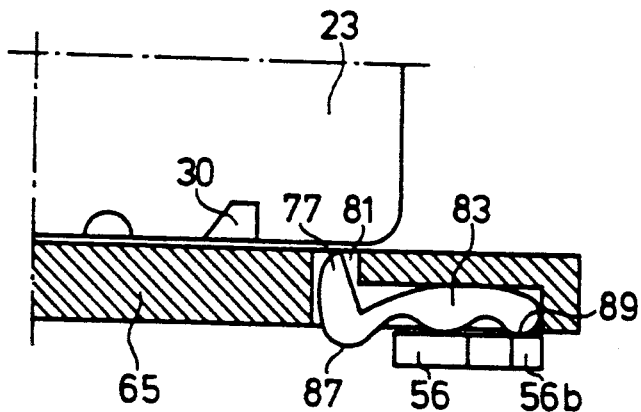
FIG. 5A shows a part of the loading device of FIG. 2 in a disengaged condition.
Figure 5B:
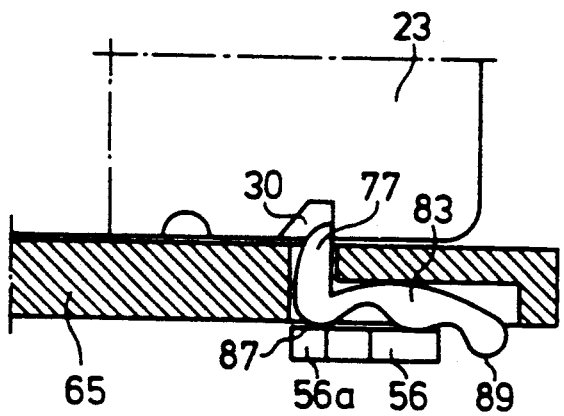
FIG. 5B shows the part of FIG. 5A in a coupled condition.

For a further explanation of the construction shown in FIGS. 2 and 3 and its operation reference is now made to FIGS. 4, 5A and 5B.

In the slid-out position of the tray 23, as is shown in FIG. 2 and as is indicated diagrammatically as position I in FIG. 4, the holder 53 is in an initial position, allowing the tray 23 containing the optical disc 3 to be slid into and out of the holder 53 by hand via the front opening 11 in the housing 5. The pivotal elements 55 to 58 then occupy substantially vertical positions, the holder 53 being situated at or substantially at a maximum distance from the frame 61 and the tray 23 with the optical disc 3 being movable substantially horizontally over the turntable 17 as it is slid in or slid out without touching the turntable. At a given instant during insertion of the tray 23 into the holder 53 the leaf spring 74 and a switch 103 arranged in the holder 53 are reached, which switch when actuated starts an electric motor 108 to drive the holder 53 via a worm 105 and a worm wheel 107.

When the electric motor 108 is started upon actuation of the switch 103, the tray 23 together with the optical disc is exactly in said position I in FIG. 4. The started electric motor 108 moves the holder 53 towards the frame 61, causing the pivotal elements 55 to 58 to perform clockwise pivotal movements about the pins 59 in order to bring the holder 53 and the tray 23 to an end position, indicated as position IV in FIG. 4. In the end position the tray 23 is situated at such a level relative to the turntable 17, that the optical disc 3 situated on the supporting surface 17a of the turntable 17 is completely clear of the tray 23.

To illustrate the operation of the loading device 51 two intermediate positions II and III of the tray 23 are shown in FIG. 4. Immediately after the holder 53 has begun to move upon actuation of the switch 103, the element portions 56a and 58a of the pivoting pivotal elements 56 and 58 engage with the contact faces 87 of the levers 83 and 85, so that these levers are moved inwardly. Since the dimensioning is such that from position I of the tray 23 the coupling projections 77 and 79 of the loading device 51 are situated opposite the recesses 41 in the tray 23, the projections 77 and 79 engage said recesses 41 during said movements of the levers 83 and 85, so that the tray 23 is, in fact, latched in the holder 53 of this moment in the loading direction. This situation is maintained until the holder 53 and the tray 23 have been returned to the initial position.

During the loading movement of the tray 23, in position II (FIG. 4) of the tray 23, the resiliently movable latching element 35 of the tray cooperates with a release arm 109, which is arranged in the frame 61 so as to be pivotable about an axis 111. As the movement proceeds, i.e. towards position III, the latching element 35 is moved backwards relative to the optical disc 3 situated in the tray 23, the release arm 109 being moved in the direction indicated by the arrow A3 in FIG. 4 and the disc 3 being clear of the tray 23 at least near the gripping member 37. As the loading movement of the holder 53 continues the optical disc 3, which has a center hole 3a, approaches the turntable 17. In position III of the tray 23 the centering mandrel 17c of the turntable 17 has already engaged the center hole 3a of the optical disc 3. This means that during the movement of the tray 23 from position III to position IV the optical disc 3 can no longer follow the movement of the tray 23, so that as the movement of the holder 53 proceeds the fixed latching elements 31 slide over the edge of the optical disc 3, causing the disc to be wholly released from the tray 23. A switch 23, not shown, ensures that the electric motor is stopped in position IV of the tray 23, which corresponds to the end position of the holder 53.

The pressure element 93 carrying the disc-pressure member 91, shown in FIG. 2, is actuated by the pivotal elements 55 and 57 during said movement of the tray 23 from position I to position IV, the disc-pressure member 91 being gradually moved towards the turntable 17. The mechanism is dimensioned in such a way that the disc-pressure member 91 does not reach the optical disc 3 until the centering mandrel 17c has engaged the center hole 3a. Moreover, actual clamping of the disc 3 onto the supporting surface 17b of the turntable 17 is not effected until the disc 3 has become fully disengaged from the tray 23.

If the electric motor 108 is started by actuation of one of the buttons 13 to move the optical disc 3 out of the disc-record player 1, the pivotal elements 55 to 59 are pivoted anti-clockwise, the tray 23 being moved from position IV (FIG. 4) to position I. The sequence of operations then performed in the loading device 51 is the inverse of the sequence during the movement of the holder 53 from the initial position to the end position as described in the foregoing. Therefore, these operations will not be described. It is to be noted, however, that briefly before position I of the tray 23 is reached the element portions 56b and 58b of the pivotal elements 56 and 58 engage with the second contact faces 89 of the levers 83 and 85, after which the levers perform a small pivotal movement to disengage the tray 23 and the holder 53 from each other. Thus the tray has remained coupled to the holder during at least an initial stage of the unloading movement, and is thereafter released. In position I the tray 23 is therefore movable relative to the holder 53, the deflected leaf spring 74 ensuring that the tray 23 comes clear of the switch 103, causing the electric motor 108 (FIG. 3) to be stopped and the pivotal movement of the pivotal elements 55 to 58 to be terminated. This also defines the end of the unloading movement of the holder 53. Removal of the tray 23 with the optical disc 3 from the disc-record player can then be effected simply by pulling the gripping member 37 of the tray 23, which projects from the holder 53.

In connection with the foregoing it is to be noted that the pivotal axes defined by the pins 59 are disposed in a plane V which is slightly inclined relative to the horizontal plane H defined by the frame 61 (FIGS. 2 and 4). This step ensures that the optical disc 3 is smoothly released from and latched in the tray 23 during the loading movement and the unloading movement respectively of the holder 53. Further, it is to be noted that a helical spring 113 is stretched between the pivotal elements 56 and 58 and the frame 61 and in position IV of the tray 23, which is the operating position of the disc record player, the spring 113 compensates for the spring forces exerted on the holder 53 by the springs 33 and 95, thereby relieving the transmission mechanism between the electric motor 108 and the holder 53.

FIGS. 6, 7A, 7B, 8A and 8B show a second example of the loading device of the disc-record player 1 of FIG. 1. Since this loading device, which bears the reference numeral 151, bears much resemblance to the loading device 51 described in the foregoing, both in respect on its construction and operation, it will be described only briefly.

The loading device 151 comprises a holder 153 and two pairs of pivotal elements 155 and 156, only one of the pair of pivotal elements 156 being visible. The pivotal elements 155 and 156 are pivotally supported by means of pins 159 in a frame 161, which near its four corner portions is secured to a frame 5a of the housing 5 by means of four resilient rings 162, of which only two rings are shown. Moreover, the pivotal elements 155 and 156 are pivotally connected to two upright side walls 165 and 167 of the holder 153 by means of pins 163. The side walls 165 and 167 are interconnected by an upper wall 169 and a rear wall 176 and at the lower side they are provided with two inwardly directed guide rails 171 which extend in a direction of movement of the tray 23, only one of said rails being visible in the drawing. A bent leaf spring 174 having two free ends 174a, of which only one end is shown, is arranged in the holder 153 at the rear wall 176. Each of the side walls 165 and 167 of the holder 153 has an opening 166 through which a lever 183, which is pivotable about an axis 183a, extends. The lever 183 has a lever portion 187 situated outside the holder and a lever portion 189 situated inside the holder. The portion 187 carries a coupling projection 177 which is adapted to cooperate with one of the recesses 41 of the tray 23 and with one of the pivotal elements 156. The portion 189 has a wall portion 178 against which the end portion 174a of the leaf spring 174 bears.

Figure 6:
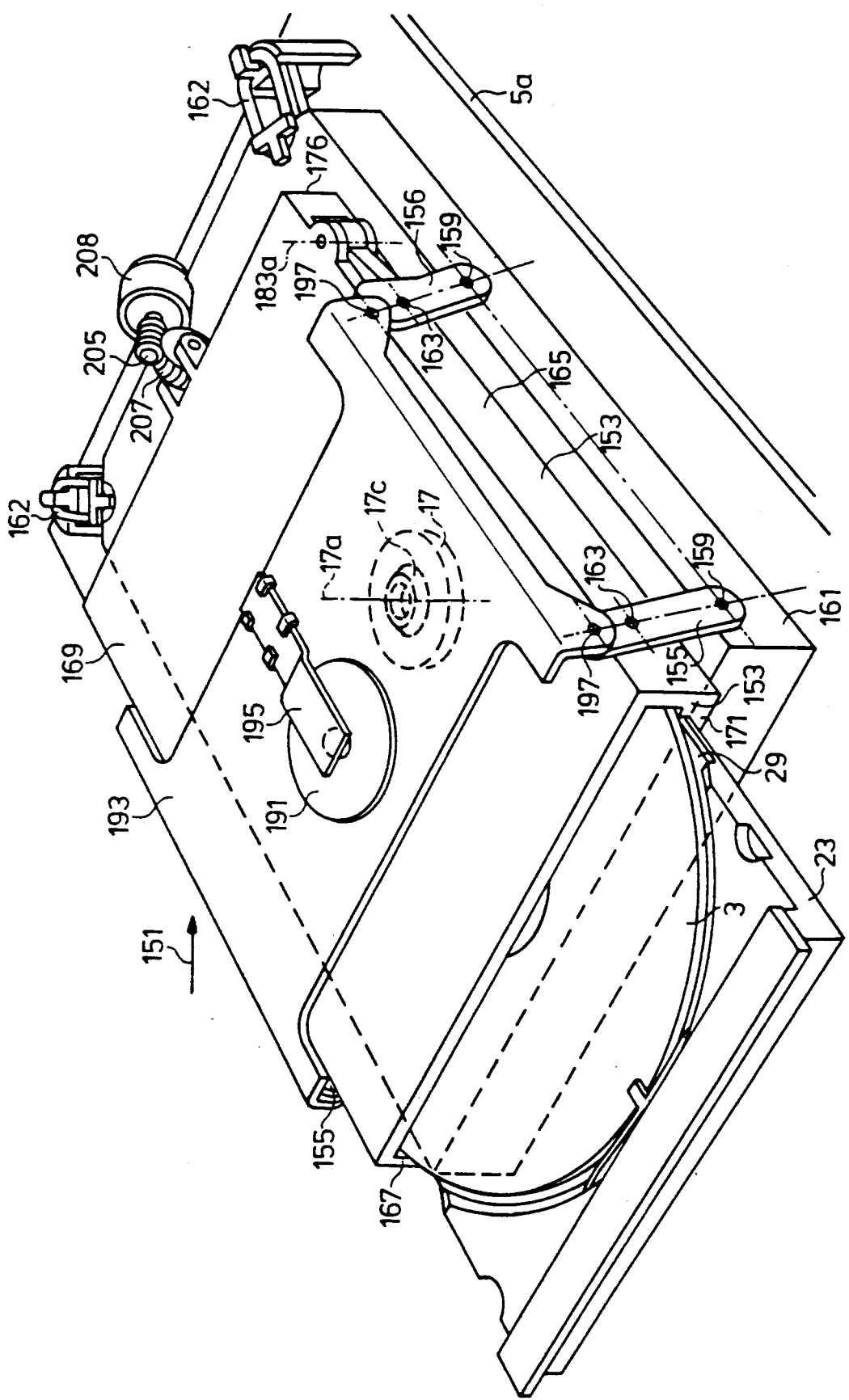
FIG. 6 is a perspective view of a second example of the loading device of the disc-record player shown in FIG. 1, the disc tray being shown partly inserted in the holder of the loading device.
Figure 7A:
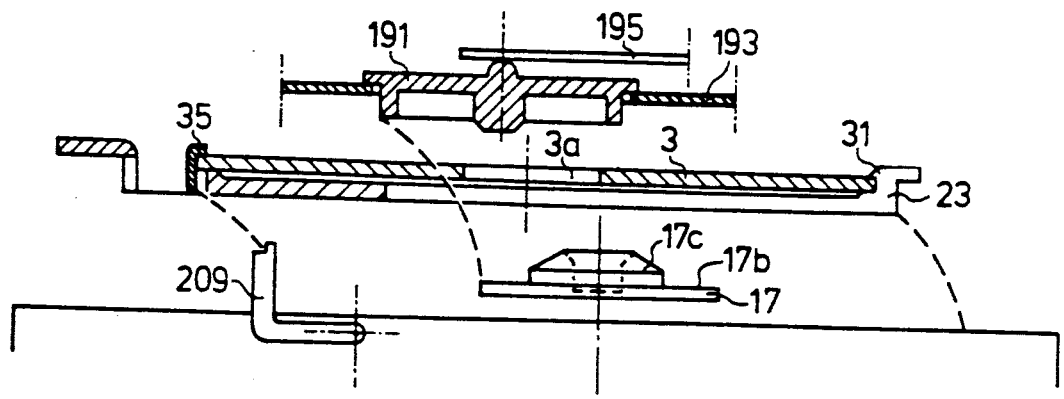
FIG. 7A shows diagrammatically the initial position of the tray relative to the loading device of FIG. 6.
Figure 7B:
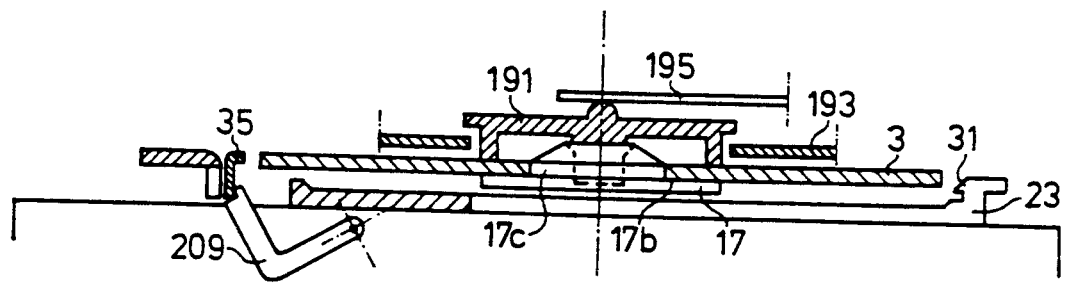
FIG. 7B diagrammatically shows the final position of the tray of FIG. 7A.

As already stated, the disc-record player shown in FIG. 1 comprises a disc-pressure member bearing the reference numeral 191 in FIGS. 6, 7A and 7B. The disc-pressure member 191 is resiliently mounted by means of a leaf spring 195 in a planar pressure element 193, which is pivotally connected to the four pivotal elements 155 and 156 by means of pins 197.

Figures 8A, 8B:
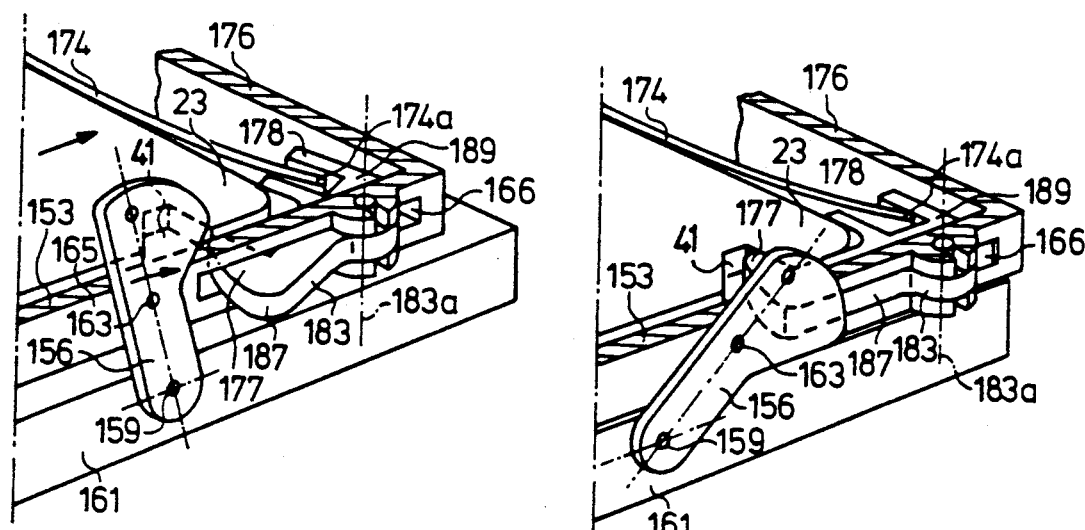
FIG. 8A shows the part of the loading device of FIG. 6 in a disengaged condition.
FIG. 8B shows the part of FIG. 8A in a coupled condition.

The tray 23 carrying the optical disc 3 can be slid rectilinearly into the holder 153, shown in its initial position in FIG. 6. At the end of the rectilinear insertion movement of the leaf spring 174 is deflected over a small distance, the lever 183 being pivoted in such a way about the pivotal axis 183a that the coupling projection 177 moves towards the tray 23 and subsequently engages one of the recesses 41 in the tray 23 to retain the tray 23 in the holder 153. The tray 23 then occupies a position relative to the turntable 17 of the disc-record player, as shown diagrammatically in FIG. 7A. FIG. 7B shows the end position of the tray 23, which is locked to the end position of the holder 51, the optical disc 3 being entirely clear of the tray and situated on the turntable 17 and the disc-pressure member 191 pressing the disc 3 onto the supporting surface 17b of the turntable 17. FIG. 8B shows how in said end position one of the pivotal elements 156 retains said lever 183 to prevent the coupling projection 177 from being disengaged from the recess 39.

It is to be noted that by means of a worm 205 and a worm wheel 207 the loading device 151 is coupled to an electric drive unit 208 secured to the frame 161 to produce the loading and unloading movements of the holder 153, during which movements the pivotal elements 155 and 156 perform pivotal movements. Moreover, it is to be noted that there is provided a release arm 209 for releasing the latching element 35 from the tray 23 during the loading movement. The operation of the release arm 209 is identical to that of the release arm 109 of the loading device 51 shown in FIG. 2. For a complete understanding of the operation of the loading device 151 reference is made to the description of the operation of the releated loading device 51.

It is obvious that the invention is not limited to the embodiments described herein. Various modifications are possible within the scope of the invention.

What is claimed is:

1. A disc-record player comprising:
 a frame and a turntable mounted to be rotatable about an axis of rotation with respect to said frame, said turntable comprising a supporting surface for a disc placed on the turntable,
 a device for recording and/or reading information on/from a disc placed on said turntable, and
 a disc-loading device comprising a holder which is adapted for receiving, while the holder is in an initial position, a tray having a supporting surface for a disc placed thereon; and means for moving said holder, and for transferring said tray and disc to said turntable and separating said disc from said tray, during movement in a loading direction from said initial position, and for returning said disc by an unloading movement to the initial position,
 characterized in that said disc-loading device comprises two pivotal elements which are pivotally connected to the frame, and are movably connected to the holder at respective sides of the holder transverse to the loading direction,
 said pivotal elements being pivoted in a first direction during said movement in a loading direction to move the supporting surface of the tray at least in a direction parallel to the axis of rotation of the turntable to a position beyond the supporting surface of the turntable, thereby placing the disc on the turntable supporting surface; and being pivoted in an opposite second direction during said unloading movement to life the disc off the turntable.

2. A disc-record player as claimed in claim 1, characterized in that the loading device comprises coupling means for coupling the tray to the holder during at least a final stage of said movement in loading direction from said initial position, and during at least an initial stage of said unloading movement to the initial position.

3. A disc-record player as claimed in claim 2, for use with a tray having at least one lateral surface formed with a recess, characterized in that said coupling means comprises at least one projection which is pivotally supported in the holder to engage the recess in the tray during the said final and initial stages of movement.

4. A disc-record player as claimed in claim 3, characterized in that said projection forms part of a lever which can be actuated by one of the pivotal elements, the relevant pivotal element cooperating with a first contact face of the lever during the loading movement of the holder to cause the projection to engage said recess, and the relevant pivotal element cooperating with a second contact face of the lever during the unloading movement of the holder to disengage the projection from said recess.

5. A disc-record player as claimed in claim 3, characterized in that inside the holder a resilient element is secured to a rear wall of the holder to cooperate with the tray.

6. A disc-record player as claimed in claim 5, characterized in that said projection forms part of a lever which can be actuated at least by said resilient element during the loading movement of the holder to cause the projection to engage said recess and which can be actuated by one of the pivotal elements during the unloading movement of the holder to disengage the projection from said recess.

7. A disc-record player as claimed in claim 6, characterized in that the lever comprises a contact portion which cooperates with the tray during the loading movement of the holder to assist the action of the resilient element.

8. A disc-record player as claimed in claim 1 in which the disc-pressure member is secured to a pressure element which is movable between a clamping position adjacent to and a position spaced from the turn-table, characterized in that at opposite sides, viewed in a direction of movement of the holder, the pressure element is movably secured to one of the pivotal elements and is also slidably secured to the holder, the pressure element being moved to the clamping position during the loading movement of the holder and to said other position during the unloading movement of the holder.

9. A disc-record player as claimed in claim 3, characterized in that the pressure element is provided with a spring construction to exert on the disc-pressure member a spring force which is directed towards the turntable.

10. A disc-record player as claimed in claim 8, characterized in that the pressure element and the disc-pressure member reach the clamping position after the disc has been deposited on the turntable.

11. A disc-record player as claimed in claim 1, in which the disc-pressure member is secured to a pressure element which is movable between a clamping position adjacent and a position spaced from the turn-table, characterized in that at opposite sides, viewed in a direction of movement of the holder, the pressure element is pivotally secured to two of the pivotal elements, the pressure element being moved to the clamping position during the loading movement and to said other position during the unloading movement of the holder.

12. A disc-record player as claimed in claim 11, characterized in that the pressure element and the disc-pressure member reach the clamping position after the disc has been deposited on the turntable.

13. A disc-record player as claimed in claim 11, characterized in that the pressure element is provided with a spring construction to exert on the disc-pressure member a spring force which is directed towards the turntable.

14. A disc-record player as claimed in claim 1, characterized in that a resilient element is arranged between the frame and at least one of the pivotal elements, to retain the holder by spring force in an end position reached after a pivotal movement of the pivotal elements.

15. A disc-record player as claimed in claim 1, for use with a tray provided with at least one fixed latching element and at least one elastically movable latching element, which latching elements are adapted to retain the disc on the supporting surface of the tray and in which the loading device comprises a release mechanism for releasing the latching elements during the loading movement of the holder, characterized in that the release mechanism comprises a release arm which is pivotally supported in the frame and which during the loading movement of the holder performs a pivotal movement to move the elastically movable latching element of the tray relative to the supporting surface of the tray in order to release the disc.

16. A disc-record player as claimed in claim 15 characterized in that said release mechanism is arranged such that the release arm cooperates with said movable latching element to allow the tray to move clear of the disc after the disc has reached the supporting surface of the turntable during the loading movement.

17. A disc-record player as claimed in claim 15 characterized in that said release mechanism is arranged such that during the initial stage of unloading movement the release arm cooperates with said movable latching element to allow the the disc to engage the supporting surface of the tray with the fixed latching element engaging over the disc; and during further unloading movement the release arm releases the movable latching element to allow the movable latching element to engage over the disc to retain the disc on the supporting surface of the tray.

18. A disc-record player as claimed in claim 1, characterized in that inside the holder a resilient element is secured to a rear wall of the holder to cooperate with the tray.

* * * * *